United States Patent Office 3,758,307
Patented Sept. 11, 1973

3,758,307
DIAZOTYPE LIGHT-SENSITIVE COMPOSITIONS CONTAINING A 4 - (N-PYRROLIDINO)-3-SUBSTITUTED BENZENE DIAZONIUM SALT
Rafiqul Islam, Sidney G. Garnish, Murray Figov, and Henry Mustacchi, London, England, assignors to GAF Corporation, New York, N.Y.
No Drawing. Continuation-in-part of application Ser. No. 548,840, May 10, 1966. This application Mar. 12, 1969, Ser. No. 806,742
Int. Cl. C07c 113/00; G03c 1/52
U.S. Cl. 96—91 R                                2 Claims

ABSTRACT OF THE DISCLOSURE

Diazotype materials and sensitizing compositions therefor wherein the sensitizer is a 4-(N-pyrrolidino)-3-substituted benzene diazonium salt wherein the substituent in 3-position is mononuclear aryl, mononuclear aryloxy, aralkyl, mononuclear alkoxyaryl, alkylthio, haloalkyl, an aldehyde group, a cyano group, a carboxyl group, a carboxy ester group or a carboacyloxy group.

This application is continuation-in-part of our application Ser. No. 548,840, filed May 10, 1966, now abandoned.

The present invention relates to diazotype sensitizing compositions comprising novel light sensitive diazonium compounds, and to diazotype materials containing said diazonium compounds in the light-sensitive layer.

For use in diazotype processes desirable diazonium compounds are those which are very sensitive to the light of mercury vapour lamps, both fluorescent and non-fluorescent. The diazonium compound used should advantageously yield dark colours with coupling components in the presence of a suitable developer e.g. an alkaline developer such as ammonia vapour.

We have found that certain novel diazonium compounds derived from novel amines exhibit the above-mentioned properties.

The novel diazonium compounds contained in the sensitizing compositions and diazotype materials of the invention have the following general formula:

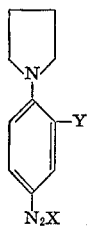
(I)

wherein Y is mononuclear aryl such as phenyl or tolyl, mononuclear aryloxy such as phenoxy, aralkyl such as benzyl or phenylethyl, mononuclear alkoxyaryl such as methoxyphenyl, alkylthio of 1–4 carbon atoms such as methylthio or ethylthio, haloalkyl of 1–4 carbon atoms such as 2-chloroethyl, 2-bromoethyl or trifluoromethyl, an aldehyde group, a cyano group, a carboxyl group, a carboxy ester group such as a methyl, ethyl, or phenyl carboxy ester group, or a carboacyloxy group such as acetoxy or benzoyloxy; and X is an anion such as chloride, sulfate, chlorozincate or chlorostannate.

According to another aspect of this invention we provide photographic diazotype material including a light sensitive layer containing a diazonium compound of the above formula. Specific diazonium compounds are those prepared for example by diazotization with nitrous acid from the following amines:

4-(N-pyrrolidino)-3-phenyl-aniline
4-(N-pyrrolidino)-3-p-tolyl-aniline
4-(N-pyrrolidino)-3-phenoxy-aniline
2-(N-pyrrolidino)-5-amino-phenyl benzyl ether
2-(N-pyrrolidino)-5-amino-phenyl-β-phenylethyl ether
4-(N-pyrrolidino)-3-methoxy phenyl-aniline
4-(N-pyrrolidino)-3-methylthio-aniline
4-(N-pyrrolidino)-3-ethylthio-aniline
4-(N-pyrrolidino)-3-phenylthio-aniline
4-(N-pyrrolidino)-3-β-chloroethyl-aniline
4-(N-pyrrolidino)-3-β-bromoethyl-aniline
4-(N-pyrrolidino)-3-trifluoromethyl-aniline
2-(N-pyrrolidino)-5-amino-benzoaldehyde
4-(N-pyrrolidino)-3-carboxy-aniline
2-(N-pyrrolidino)-5-amino-benzoic acid methyl ester
2-(N-pyrrolidino)-5-amino-benzoic acid phenyl ester
2-(N-pyrrolidino)-5-amino-phenyl acetate
2-(N-pyrrolidino)-5-amino-phenyl benzoate A method for preparing the novel amines yielding the diazonium compounds of the General Formula I as defined above comprises condensing a compound having the general formula:

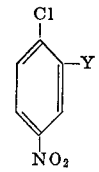

wherein Y has the abovementioned significance, with pyrrolidine or a substituted pyrrolidine to obtain a compound having the general formula:

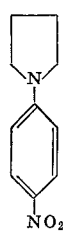
(III)

and reducing the said nitro compound to obtain the corresponding amine. Upon diazotisation the corresponding diazonium compound is obtained. The diazonium compound may be obtained as a double salt, for example by precipitation with zinc chloride.

Compound III may also be obtained by condensing pyrrolidine with 5-nitro-2-aminophenol and then arylating, esterifying, acylating or aralkylating the hydroxy group; or by arylating etc., the hydroxy group of 5-nitro-2-amino-phenol and then condensing with pyrrolidine.

Compound II may be obtained from the corresponding compound having the general formula:

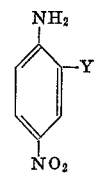
(IV)

wherein Y is as defined above, by diazotisation of the latter and application of the Sandmeyer reaction.

The preparation of 2-(N-pyrrolidino)-5-amino-benzoic acid may be carried out as follows: 2-chloro-5-nitrobenzoic acid is refluxed for six hours with excess pyrrolidine, and the mixture is then poured into water. The solid is isolated, washed with water and recrystallized from alcohol to give yellow crystals of 2-(N-pyrrolidino)-5-nitro-benzoic acid, M.P. 225° C. This compound is reduced with zinc dust and hydrochloric acid or by catalytic hydrogenation to give 2-(N-pyrrolidino)-5-amino-benzoic acid.

Similar condensation of pyrrolidine with the following intermediate chloro compounds:

Similar condensation of pyrrolidine with 3-trifluoromethyl-4-chloronitrobenzene gives 4-(N-pyrrolidino)-3-trifluormethylnitro benzene, M.P. 94° C.

The nitro compounds are reduced to the amines and diazotised in the usual manner giving corresponding diazo compounds which are isolated as complex salts of zinc chloride, cadmium chloride and as the borofluoride.

The following examples illustrate diazotype materials of the present invention:

EXAMPLE I

A white base paper is coated with a sensitizing liquid having the following composition:

| | G. |
|---|---|
| Water | 100 |
| Tartaric acid | 3.5 |
| Thiourea | 5 |
| Urea | 2 |
| Zinc chloride | 3 |
| 2:7-dihydroxy naphthalene, 3:6-disulphonic acid (sodium salt) | 1.5 |
| m-Hydroxy-phenyl-urea | 0.5 |
| Resorcinol | 0.25 |
| Aceto-acetanilide | 0.1 |
| 4-N-pyrrolidino - 3 - carboxylic acid-benzene diazonium chloride, zinc chloride double salt | 1.2 |
| Polyethylene Glycol 200 | 5 |

The coated paper covered by a "master" tracing is exposed to a mercury vapor lamp to obtain a latent image which is subsequently developed by gaseous ammonia. The developed diazo-type copy showed a dense black image on a clear white background.

EXAMPLE II

A tracing paper is coated with a sensitizing liquid having the following composition:

| | G. |
|---|---|
| Water | 75 |
| Ethyl alcohol | 25 |
| Isopropyl alcohol | 5 |
| Citric acid | 2.5 |
| Thiourea | 4 |
| Zinc chloride | 3 |
| Resorcinol | 3 |
| 4-N-pyrrolidino - 3 - trifluoromethylbenzene diazonium chloride, zinc chloride double salt | 2.5 |
| Polyvinyl acetate salt | 5 |

The coated tracing paper is exposed in the manner described in Example I and the latent diazo-type image is developed by gaseous ammonia. The developed diazotype copy showed a dark yellow image on a clear background. The yellow image has a high actinic opacity and gives a subsequent print of great contrast.

EXAMPLE III

A white base paper is coated with a sensitizing liquid having the following composition:

| | G. |
|---|---|
| Water | 100 |
| p-Toluene sulphonic acid | 3 |
| Diethylene glycol | 5 |
| d-Resorcylic acid ethanolamide | 1 |
| 4-N-pyrrolidino - 3 - benzyloxy benzene diazonium chloride, zinc chloride double salt | 1 |
| Thiourea | 4 |
| Zinc chloride | 3 |

The coated paper is exposed in the manner described in Example I, and developed by gaseous ammonia. The developed diazo type copy showed a bright red image on a clear white background.

Diazonium compounds corresponding to the other amines listed above as intermediates for the sensitizing compositions of the invention can be similarly incorporated in the sensitizing formulations of the examples and coated upon paper to provide diazotype materials in accordance with this invention.

We claim:

1. A sensitizing composition for diazotype light sensitive photoprinting material, said composition containing a sensitizing amount of 4-(N-pyrrolidino-3-carboxylic acid benzene diazonium chloride zinc chloride double salt.

2. A sensitizing composition for diazotype light sensitive photoprinting material, said composition containing a sensitizing amount of 4-(N-pyrrolidino-3-benzyloxy benzene diazonium chloride zinc chloride double salt.

References Cited

UNITED STATES PATENTS

| 2,350,843 | 6/1944 | Vanselow et al. | 260—141 X |
|---|---|---|---|
| 3,948,613 | 8/1960 | Cox et al. | 260—141 X |
| 3,281,245 | 10/1966 | Werner et al. | 260—141 X |
| 3,281,246 | 10/1966 | Rauhut et al. | 260—141 X |
| 3,407,066 | 10/1968 | Mustacchi et al. | 260—141 X |
| 3,416,925 | 12/1968 | Sus et al. | 260—141 X |
| 3,442,650 | 5/1969 | Hendrickx et al. | 260—141 X |
| 3,442,652 | 5/1969 | Hendrickx et al. | 260—141 X |
| 3,397,058 | 8/1968 | Van Loon et al. | 260—141 X |
| 3,615,570 | 10/1971 | Werner et al. | 260—141 |

FOREIGN PATENTS

| 919,037 | 2/1963 | Great Britain | 260—141 |
|---|---|---|---|

FLOYD D. HIGEL, Primary Examiner

U.S. Cl. X.R.

96—33, 49, 75; 260—141, 142, 326.3, 326.8, 326.82, 326.84, 326.85